A. C. Vaughan,
Mortising Machine.

Nº 27,397.          Patented Mar. 6, 1860.

Witnesses
E. Cohen
Tho. H. Ufferman

Inventor
Aaron C. Vaughan
per atty A. B. Stoughton

UNITED STATES PATENT OFFICE.

AARON C. VAUGHAN, OF RAINSBURG, PENNSYLVANIA.

MORTISING-MACHINE.

Specification of Letters Patent No. 27,397, dated March 6, 1860.

*To all whom it may concern:*

Be it known that I, AARON C. VAUGHAN, of Rainsburg, in the county of Bedford and State of Pennsylvania, have invented certain new and useful Improvements in Machines for Cutting Square or Oblong Mortises; and I do hereby declare the following to be a full, clear, and exact description of the construction and operation of the same, reference being had to the accompanying drawings, making a part of this specification, in which—

Figure 1:
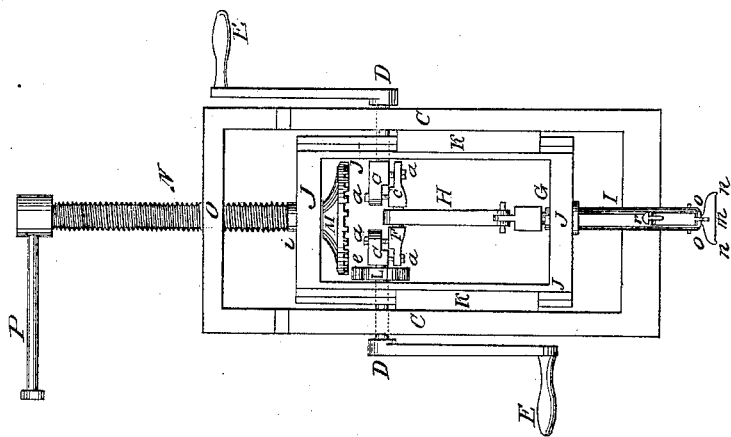
Figure 3:
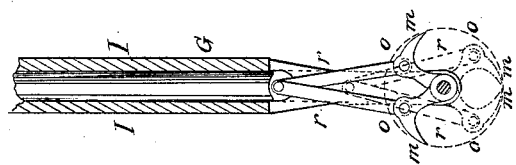
Figure 2:
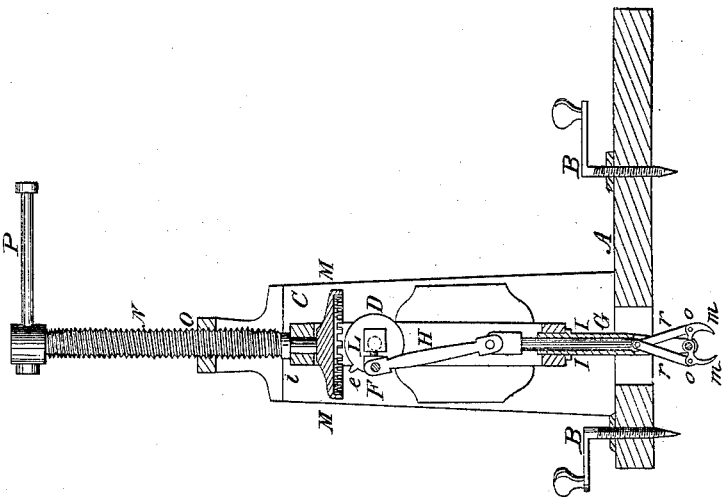

Figure 1, represents a front view of the machine. Fig. 2, represents a longitudinal vertical section through the same, and Fig. 3, represents the cutters, and their more immediate connected parts, together with a sectional view of the tube, on an enlarged scale, to more clearly show their operation.

Similar letters of reference where they occur in the several figures denote like parts of the machine in all the drawings.

My invention consists in cutting square or oblong mortises by the use of two hinged cutters that, work toward each other when cutting, and from each other as they are raised or drawn back for each succeeding cut, as will be explained hereafter.

To enable others skilled in the art to make and use my invention, I will proceed to describe the same with reference to the accompanying drawings.

A, represents a base or board upon which the machine is arranged, this base being furnished with screws B, B, or other suitable fastenings by which it can be secured to the piece in which the square or oblong mortise is to be cut, and as readily removed, and adjusted, as may be required. On this base A, is arranged the uprights C, C, in long slots in which uprights, is hung a crank shaft D, that has upon one, or both of its ends a winch E, by which it may be turned. The crank F, on this shaft is made adjustable by the set screws *a, a, a, a*, and the shoulders *c, c, c, c*, so that the length of stroke of the rod or shaft G, may be properly adjusted to the special work which the machine is to do. The rod or shaft G, (which might properly be called the cutter-stock, inasmuch as it carries the cutters, as will be hereafter explained) is attached to the crank F, by a pitman H, and works through a hollow-guide tube or shaft I, that is arranged in a sliding gate J that moves in ways K, connected to the uprights *c, c*.

On the crank shaft D, is a wheel L, that has but a single tooth *e* on its perimeter, though may have more if found desirable; and every revolution of the said crank shaft, causes this tooth or cog *e*, to take into the cogs of the bevel wheel M, and give said bevel wheel, as well as the screw shaft N, connected with, or to it, a portion of a revolution also. The shaft N, has a male screw cut upon it, and it works in a female screw in the cross head O, on top of the uprights C; and a collar *i* upon said screw shaft rests upon the gate J while the bevel wheel M, is below the cross piece of the gate, so that the turning of the bevel wheel M, or of the screw shaft N, causes the gate J and all its appendages to move up or down, to feed up the cutters or to draw them out of the mortise. There is a lever P, in the top of the screw rod, to operate said rod by hand, when it is desirable to do so.

In the lower end of the tube or hollow shaft I, is pivoted two nipper-jaw cutters *m, m*, with sharp cutting edges to gouge out the wood, and lips *n, n*, at their corners to score out, and keep smooth, the corners and margins of the mortise as it is being cut. To lugs *o* on these cutters, are pivoted the lower ends of two toggle arms *r, r*, respectively, their upper ends being pivoted to the lower end of the shaft G.

The operation is as follows: As the crank shaft D is turned, the rod G is drawn up, bringing up with it the cutters *m*, and spreading them as shown in black lines Fig. 3. As the rod G descends, it causes (through its toggle arms *r, r*,) the cutters to approach each other, and to cut or score out anything in their path, until at the end of the down stroke of the rod G, the cutting edges have come together as shown by red lines in said Fig. 3; and as the shaft and cutters are thus worked, they are automatically fed up to the work by means of the screw rod N, operated as above stated.

I am aware that machines have been devised for cutting square mortises, but they operated entirely different from mine. I do not claim therefore the principle of cutting square mortises, but What I do claim as new, and desire to secure by Letters Patent, is—

Two nipper-jaw cutters, constructed and operating substantially as herein described, for the purpose of cutting a square or oblong mortise in wood, and this I claim whether the cutters be operated or fed up to their work, by the mechanical contrivances herein represented, or by any others substantially the same.

AARON C. VAUGHAN.

Witnesses:
A. B. STOUGHTON,
THOS. H. UPPERMAN.